(12) United States Patent
Bordynuik (10) Patent No.: US 9,196,296 B2
(45) Date of Patent: Nov. 24, 2015

(54) SYSTEM AND METHOD FOR READING A MAGNETIC TAPE

(75) Inventor: John William Bordynuik, Thorold (CA)

(73) Assignee: JBI INC, Niagara Falls, NY (US)

( * ) Notice: Subject to any disclaimer, the term of this patent is extended or adjusted under 35 U.S.C. 154(b) by 0 days.

(21) Appl. No.: 13/884,075

(22) PCT Filed: Nov. 8, 2011

(86) PCT No.: PCT/US2011/059702
§ 371 (c)(1),
(2), (4) Date: May 8, 2013

(87) PCT Pub. No.: WO2012/064691
PCT Pub. Date: May 18, 2012

(65) Prior Publication Data
US 2013/0229725 A1    Sep. 5, 2013

Related U.S. Application Data

(60) Provisional application No. 61/411,156, filed on Nov. 8, 2010.

(51) Int. Cl.
G11B 5/09 (2006.01)
G11B 20/10 (2006.01)
G11B 5/008 (2006.01)

(52) U.S. Cl.
CPC ...... *G11B 20/10037* (2013.01); *G11B 5/00813* (2013.01); *G11B 20/10046* (2013.01); *G11B 20/10268* (2013.01); *G11B 2220/90* (2013.01)

(58) Field of Classification Search
CPC ............... G11B 20/10314; G11B 20/10361
See application file for complete search history.

(56) References Cited

U.S. PATENT DOCUMENTS

| | | | |
|---|---|---|---|
| 4,796,110 A | 1/1989 | Glass et al. | |
| 6,297,920 B1 * | 10/2001 | Saito et al. | 360/53 |
| 7,253,980 B1 * | 8/2007 | Pham et al. | 360/46 |
| 2003/0053241 A1 | 3/2003 | Misawa | |
| 2007/0019316 A1 * | 1/2007 | Norton, Jr. | 360/29 |
| 2007/0025004 A1 * | 2/2007 | Stein et al. | 360/31 |
| 2008/0030887 A1 | 2/2008 | Ochi et al. | |
| 2008/0291568 A1 | 11/2008 | Takakura et al. | |

OTHER PUBLICATIONS

International Search Report from PCT/US2011/059702; Jun. 29, 2012; Lee Byoung Soo.

* cited by examiner

*Primary Examiner* — Daniell L Negron
(74) *Attorney, Agent, or Firm* — BCF LLP (57) ABSTRACT

A system for reading a magnetic tape is provided. The system comprises a magnetoresistive head, a tape controller, an analog-to-digital converter and a processing unit. The tape transport controller controls a movement of a magnetic tape with respect to the magnetoresistive head. The analog-to-digital converter generates a signal upon receiving an analog signal read by the magnetoresistive head on the magnetic tape. The processing unit identifies a magnetic flux transition in the signal to detect a bit from the signal from the signal based on the identified magnetic flux transition. Identification of the magnetic flux transition in the signal includes analyzing voltage wave forms of the signal. A method and a computer readable storage medium for reading a magnetic tape are also disclosed.

10 Claims, 5 Drawing Sheets

SYSTEM AND METHOD FOR READING A MAGNETIC TAPE

TECHNICAL FIELD

The present invention relates to a system and method for reading a magnetic tape.

BACKGROUND

For the last sixty years, magnetic tapes have been used for data storage, backup and restoration of analog and digital information. Over these years, data has been stored on magnetic tapes having various tape formats, and using various compression/validation/correction algorithms and with various reading/writing devices. Years after the storage of data on such magnetic tapes, technical obstacles regarding successful reading of old or damaged magnetic tapes have appeared.

One example of such technical obstacles relates to tracks that were written on magnetic tapes by computers that had no operating systems, resulting in a lack of documentation in the mapping of recorded bits to numbers and letters. This is problematic in that the recorded bits were encoded with non-standard character sets, as opposed to standard character sets such as, for example, ASCII and EBCDIC, in use today.

Another example of such technical obstacles relates to tracks on magnetic tapes being misaligned or magnetic tapes that had momentarily shifted in the tape path thereby causing erratic skewing issues. Both of these cases result in missing bits on tracks causing parity errors or bit loss upon reading of the magnetic tape.

An additional example of such technical obstacles relates to the proximity of layers of a magnetic tape on a tape spool. This proximity can cause the imprint of magnetic information of one layer of a tape on an adjacent layer or layers of the magnetic tape, thereby shifting copies of a signal backwards and/or forwards along the magnetic tape. Such shifting of copies of the signal can give false positives for bit determination.

Another example of such technical obstacles relates to the use of induction heads to read magnetic tapes. Induction heads require the magnetic tape to be read at a specific speed for which the magnetic tape was originally designed. In addition, metal oxide present on magnetic tapes might shed from the tape binder due to sticky tape syndrome.

An additional example of such technical obstacles relates to magnetic tapes that have been damaged magnetically and/or mechanically and including print through and bit drop out errors.

Another example of such technical obstacles relates to the presence of weak bits on magnetic tapes.

Therefore, there is a need for a system and method for reading a magnetic tape that helps in overcoming at least one (and preferably more) of the technical obstacles mentioned above.

SUMMARY

Embodiments of a system or method for reading a magnetic tape according to the present invention help to overcome at least one of the technical obstacles mentioned above.

An example embodiment of a magnetic tape reading system has a magnetoresistive head, a tape transport controller, an analog-to-digital converter and a processing unit. The tape transport controller controls a movement of a magnetic tape with respect to the magnetoresistive head. The analog-to-digital converter is electronically connected to the magnetoresistive head. The analog-to-digital converter generates a signal upon receiving an analog signal read by the magnetoresistive head on the magnetic tape. The processing unit is electronically connected to the analog-to-digital converter and is electronically connected to the tape transport controller. The processing unit is configured to run a software program stored in a memory. The software program includes instructions for identifying a magnetic flux transition in the signal and detect a bit from the signal based on the identified magnetic flux transition.

In another aspect, the instructions of the software program for identifying a magnetic flux transition in the signal comprise instructions for analyzing voltage wave forms of the signal.

In another aspect, the processing unit comprises a peak detector and an area calculator.

In another aspect, the instructions of the software program for analyzing voltage wave forms of the signal comprise instructions for: calculating an average threshold offset based on an average signal amplitude of at least a portion of the signal, the average signal amplitude being calculated based on a first output of the peak detector; and calculating an average area threshold based on a pulse area of at least a portion of the signal, the pulse area being calculated based on a first output of the area calculator.

In another aspect, the instructions of the software program for detecting a bit from the signal based on the identified magnetic flux transition comprise instructions for: calculating an adjusted pulse amplitude based on a second output of the peak detector; calculating a pulse area based on a second output of the area calculator; comparing the adjusted pulse amplitude with the average threshold offset; and comparing the pulse area with the average area threshold.

In another aspect, the instructions of the software program further include instructions for: determining whether an error occurred in the detection of the bit; and causing the tape transport controller to reverse a tape direction to allow the magnetoresistive head to reread a portion of the magnetic tape.

In another aspect, a memory stores data regarding where a magnetic flux transition occurred based on a position value of the tape transport controller.

In another aspect, the magnetic tape reading system comprises a discrete-current-to-voltage converter electronically connected to the magnetoresistive head and electronically connected to the analog-to-digital converter.

In another aspect, the processing unit is a field-programmable gate array. The memory and a processor are embedded in the field-programmable gate array.

In another aspect, the magnetic tape reading system comprises a high-pass filter, the high-pass filter removing random offsets from the signal generated by the analog-to-digital converter.

In another aspect, the magnetoresistive head is a multi-channel head adapted to read at least two channels of the magnetic tape and wherein the analog-to-digital converter and the processing unit are adapted to process at least two signals in parallel.

An example embodiment of a method of reading a magnetic tape comprises reading an analog signal located on a magnetic tape with a magnetoresistive head; converting the analog signal into a digital signal with an analog-to-digital converter; identifying a magnetic flux transition in the digital signal with a processing unit; and detecting a bit from the digital signal based on the identified magnetic flux transition.

In another aspect, identifying a magnetic flux transition in the digital signal comprises analyzing voltage wave forms of the digital signal.

In another aspect, analyzing voltage wave forms of the digital signal comprises: calculating an average threshold offset based on an average signal amplitude of at least a portion of the digital signal; and calculating an average area threshold based on a pulse area of at least a portion of the digital signal.

In another aspect, detecting a bit from the digital signal based on the identified magnetic flux transition comprises: calculating an adjusted pulse amplitude of the digital signal; calculating a pulse area of the digital signal; comparing the adjusted pulse amplitude with the average threshold offset; and comparing the pulse area with the average area threshold.

In another aspect, the method further comprises determining whether an error occurred in the detection of the bit; and causing a tape transport controller to reverse a tape direction to allow the magnetoresistive head to reread a portion of the magnetic tape.

In another aspect, the method further comprises storing in a memory data regarding where a magnetic flux transition occurred based on a position value of the tape transport controller.

In another aspect, the method further comprises reading a second analog signal with the magnetoresistive head; and processing a second digital signal in parallel with reading the analog signal with the magnetoresistive head and processing the digital signal.

An example embodiment of a computer readable storage medium containing program code for execution by a computing device for implementing a computer-implemented method of processing an analog signal read on a magnetic tape comprises: converting the analog signal into a digital signal; identifying a magnetic flux transition in the digital signal; and detecting a bit from the digital signal based on the identified magnetic flux transition.

In another aspect, identifying a magnetic flux transition in the digital signal comprises analyzing voltage wave forms of the digital signal.

In another aspect, analyzing voltage wave forms of the digital signal comprises: calculating an average threshold offset based on an average signal amplitude of at least a portion of the digital signal; and calculating an average area threshold based on a pulse area of at least a portion of the digital signal.

In another aspect, detecting a bit from the digital signal based on the identified magnetic flux transition comprises: calculating an adjusted pulse amplitude of the digital signal; calculating a pulse area of the digital signal; comparing the adjusted pulse amplitude with the average threshold offset; and comparing the pulse area with the average area threshold.

In another aspect, the computer-implemented method further comprises determining whether an error occurred in the detection of the bit; and causing a tape transport controller to reverse a tape direction to allow the magnetoresistive head to reread a portion of the magnetic tape.

In another aspect, the computer-implemented method further comprises storing in a memory data regarding where a magnetic flux transition occurred based on a position value of the tape transport controller.

In another aspect, the computer-implemented method further comprises reading a second analog signal with the magnetoresistive head; and processing a second digital signal in parallel with reading the analog signal with the magnetoresistive head and processing the digital signal.

Additional and/or alternative features, aspects, and advantages of embodiments of the system and method for reading a magnetic tape will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
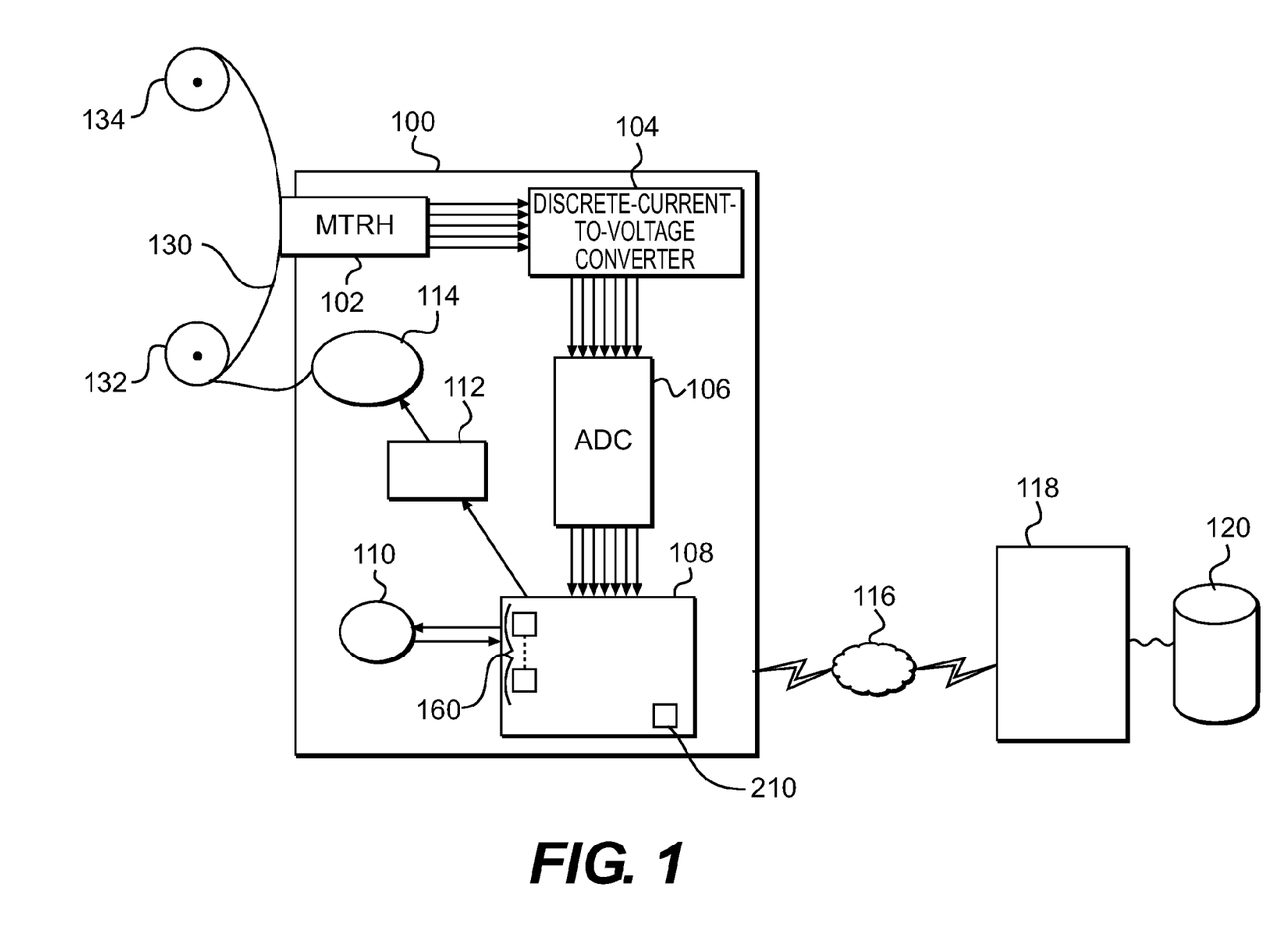
FIG. 1 is a schematic representation of a system for reading a magnetic tape according to an embodiment of the invention.

FIG. 1 illustrates a system for reading a magnetic tape 100 including a magnetoresistive head 102 (MTRH), a tape transport controller 112, a discrete-current-to-voltage converter 104, an analog-to-digital converter 106 (ADC), a processing unit 108, a tachometer 110 and a motor 114.

The magnetoresistive head 102 is a multi-channel head that allows multiple tracks stored on a magnetic tape 130 to be read in parallel. The tape transport controller 112 is electronically connected to the motor 114 to control a movement of the magnetic tape 130 with respect to the magnetoresistive head 102. The tape transport controller 112 controls a rotation speed and a rotation direction of the motor 114. The motor 114 is electronically connected to the tachometer 110. The tachometer 110 is configured to determine position values of the magnetic tape 130. The motor 114 is operationally connected to the spools 132 and 134 on which the magnetic tape 130 is disposed. The rotation speed of the motor 114 can be varied by the tape transport controller 112 based on a condition of the magnetic tape 130 (e.g. if the magnetic tape 130 is damaged). In an embodiment, the tape transport controller 112 varies the rotation speed of the motor 114 so that a speed of the magnetic tape 130 with respect to the magnetoresistive head 102 varies from 12.7 cm (5 inches) per second up to 330.2 cm (130 inches) per second. In an embodiment, the tape transport controller 112 can be controlled by hardware or firmware and reacts in response to an analog signal stored on the magnetic tape 130.

The magnetoresistive head 102 is electronically connected to the discrete-current-to-voltage converter 104. The discrete-current-to-voltage converter 104 is electronically connected to the analog-to-digital converter 106. Upon reading an analog signal located on a track of the magnetic tape 130, the magnetoresistive head 102 transmits the analog signal to the discrete-current-to-voltage converter 104. The discrete-current-to-voltage converter 104 biases and pre-amplifies the analog signal. The analog signal is amplified and transmitted to the analog-to-digital converter 106. (Although in this embodiment the amplifier is included within the discrete-current-to-voltage converter 104 (and not separately identified), it may be a separate component in other embodiments.) The analog-to-digital converter 106 converts the analog signal into a digital signal. The discrete-current-to-voltage converter 104 and the analog-to-digital converter 106 are designed so as to provide a high signal-to-noise ratio allowing the system 100 to detect a weak bit, generally 1/10 the amplitude of an average amplitude of a bit.

Although a single analog-to-digital converter 106 is depicted, it is contemplated that a cluster of analog-to-digital converters can also be used, each analog-to-digital converter of the cluster processing one of the channels.

Figure 2:
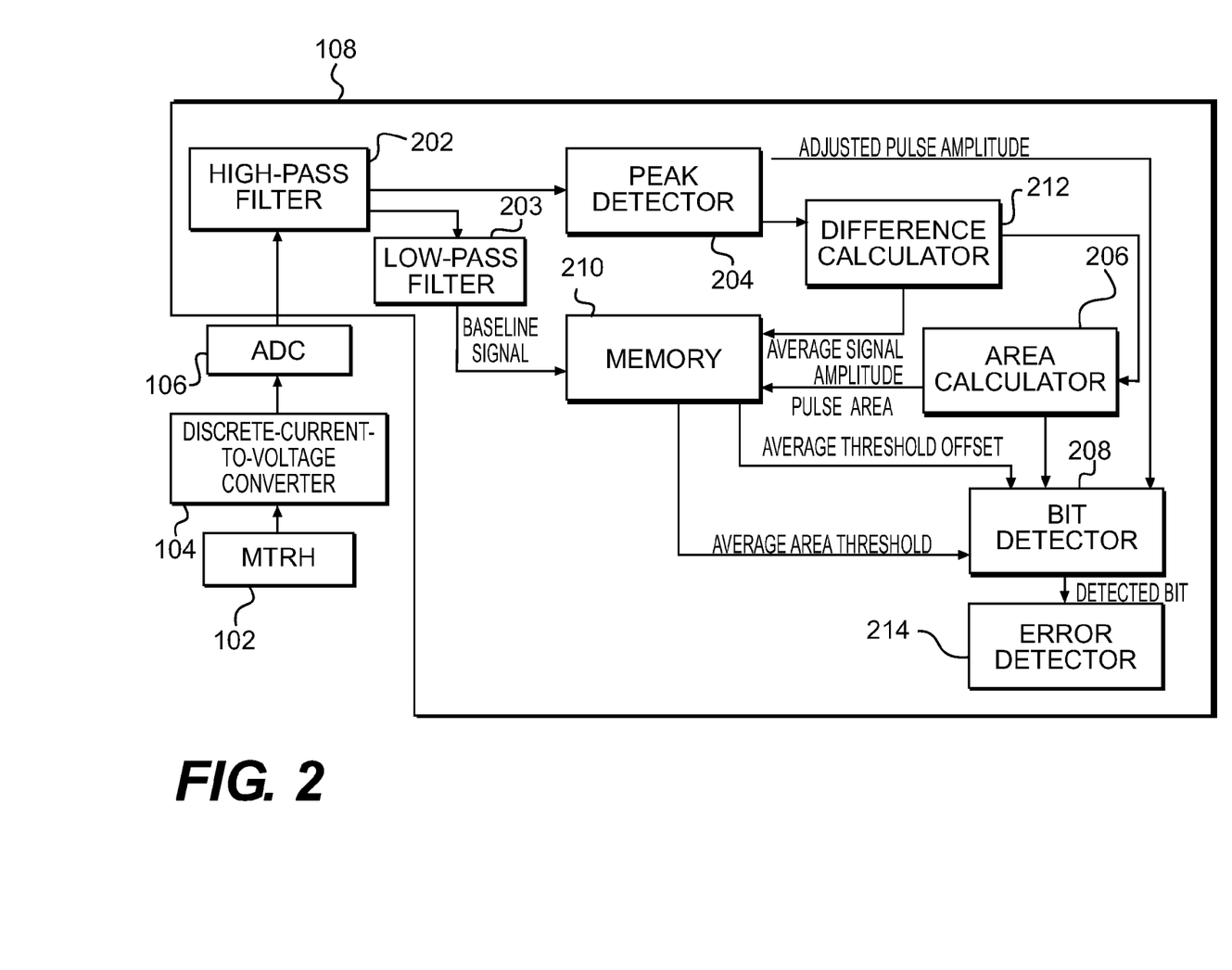
FIG. 2 is a schematic representation of a processing unit and additional components of the system for reading a magnetic tape according to an embodiment of the invention.

The processing unit 108, in an embodiment, is formed by a field-programmable gate array comprising a series of RISC processors 160 configured to run a software program stored in a memory 210. Although shown with a series of RISC processors 160, the processing unit may be implemented with a single processor. In an embodiment, the memory 210 is embedded in the field-programmable gate array. It is equally feasible to implement the field-programmable gate array and the memory 210 in two separate components. The software program includes instructions to identify a magnetic flux transition in the digital signal and detect a bit from the digital signal based on the identified magnetic flux transition. The instructions of the software program to identify a magnetic flux transition in the digital signal comprise instructions to analyze voltage wave forms of the digital signal.

The system 100 is connected to a data server 118 via a network 116. The network 116 is preferably a local area network (e.g. Ethernet network) but may also be the Internet. The data server 118 comprises a database 120. The system 100 transmits data to the data server 118 for storage in the database 120. The data transmitted to the data server 118 includes bits stored on the magnetic tape 130 and detected by the processing unit 108. In an embodiment, the data may also comprise original information from the magnetic tape 130 in the form of a magnetic tape image along with a file that contains a record by record data including parity information, record length and longitudinal parity checksums. In an embodiment, the data is also time stamped in the database 120.

Turning now to FIG. 2, the processing unit 108, according to an embodiment, will now be presented in more details. In an embodiment, the processing unit 108 comprises a high-pass filter 202, a low-pass filter 203, a peak detector 204, an area calculator 206, a bit detector 208, the memory 210, a difference calculator 212 and an error detector 214. In an embodiment, the high-pass filter 202, the low-pass filter 203, the peak detector 204, the area calculator 206, the bit detector 208, the difference calculator 212 and the error detector 214 are embedded in a field-programmable gate array as being software components executed by the field-programmable gate array.

Upon conversion of the analog signal by the analog-to-digital converter 106, the digital signal is received by the processing unit 108 and is filtered by the high-pass filter 202 in order to eliminate random noise and DC offsets that may be generated by the analog-to-digital converter 106. The digital signal is received by the processing unit 108 and is filtered by the low pass filter 203 which determines an average value of the signal, also called the "baseline signal." In an embodiment, the high-pass filter 202 is a first order filter. The high-pass filter 202 determines an averaged value of the signal, also called "baseline signal". The "baseline signal" is subtracted from the digital signal inputted to the high-pass filter 202 to obtain a high-pass filtered digital signal. In an embodiment, the "baseline signal" is stored in the memory 210 for later access by the processing unit 108.

The high-pass filtered digital signal is processed by the peak detector 204 and the area calculator 206. The peak detector 204 detects a minimum and a maximum of the digital signal in order to establish a peak of a positive pulse and/or a peak of a negative pulse, thereby determining pulse amplitude of the signal. The pulse amplitude is then reduced by the "baseline signal" to obtain an "adjusted pulse amplitude". In addition, positive and negative peaks of a preset number of detected bits are passed through the difference calculator 212 to determine an "average signal amplitude". An "average threshold offset", calculated by determining the value of a certain percentage (for example 20%) of the "average signal amplitude" of a preset number of detected bits is maintained by the processing unit 108, for example, by storing the "average threshold offset" in the memory 210. In an embodiment, the "average threshold offset" is preloaded with a constant during initialisation of the system 100.

The "adjusted pulse amplitude" resulting from the processing of the peak detector 204 is then passed through the area calculator 206. Boundaries of an area calculation of the signal are set when the digital signal inputted in the area calculator 206 intersects with the "baseline signal". The calculated area is then reduced by the "average threshold offset" to determine the "pulse area". In addition, an "average area threshold", calculated by averaging a certain percentage (for example 20%) of the "pulse area" of a preset number of detected bits is maintained, for example, by storing the "average area threshold" in the memory 210. In an embodiment, the "average area threshold" is preloaded with a constant during initialisation of the system 100.

The bit detector 208 detects a bit if a magnetic flux transition on the analog signal of the magnetic tape 130 occurred. In an embodiment, this determination is made based on the "adjusted pulse amplitude", the "average threshold offset", the "pulse area" and the "average area threshold". A bit is detected by the bit detector 208 if the "adjusted pulse amplitude" is greater than the "average threshold offset" and if the "pulse area" is greater than the "average area threshold". The bit detector 208 also determines a polarity of the detected bit. The detected bit and a polarity of the detected bit are stored in a first in, first out (FIFO) memory for processing by the error detector 214. In an embodiment, the FIFO memory is embedded in the memory 210.

The error detector 214 processes the detected bits stored in the FIFO memory and detects if an error occurred based on certain criteria. In an embodiment, the error detector 214 detects an error if two detected adjacent bits have a same polarity, or if the cyclic redundancy check (CRC) is incorrect, or if longitudinal parity checksum errors are found. If the error detector 214 detects an error, the processing unit 108 causes the tape transport controller 112 to reverse the direction of the magnetic tape 130 to allow the magnetoresistive head 102 to reread a portion of the magnetic tape 130. Since information regarding where a magnetic flux transition occurred is matched through a position value of the tachometer 110, the tape transport controller 112 can reverse the magnetic tape 130 to a position (just) before the error occurred. In an embodiment, the error detector 214 analyzes a domain of a span of the byte (i.e. the period of byte—which is also a bit) or a block of the magnetic tape 130. The detector listens during the bit time to ensure there is not another magnetic flux transition during that period. In other words, a single bit is oversampled 25×, so if the span is 25, and the detector gets another bit during that period there would be an error. If the error detector 214 determines that no error occurred, the detected bit is transmitted by the system 100 to the data server 118 for storage in the database 120.

Figure 3:
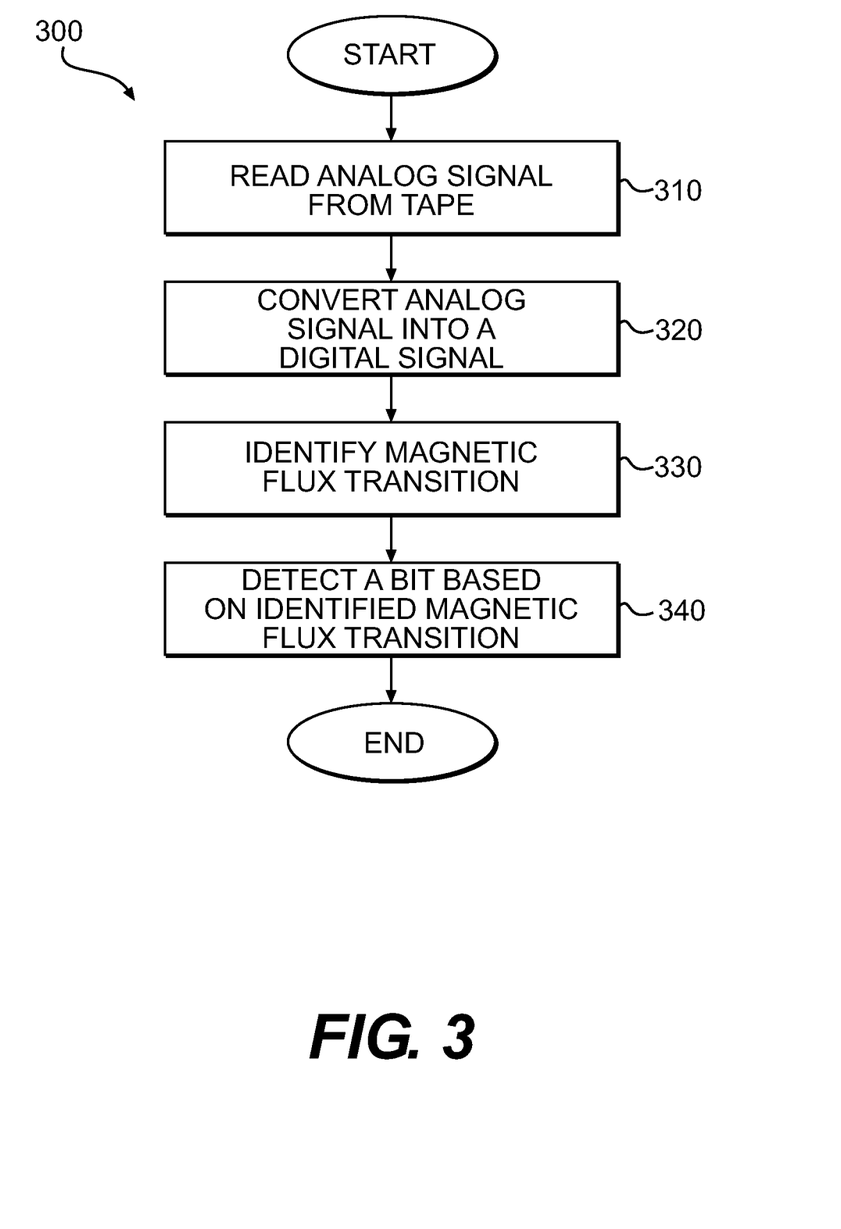
FIG. 3 is a flowchart of a method of reading a magnetic tape according to an embodiment of the invention.
Figure 4:
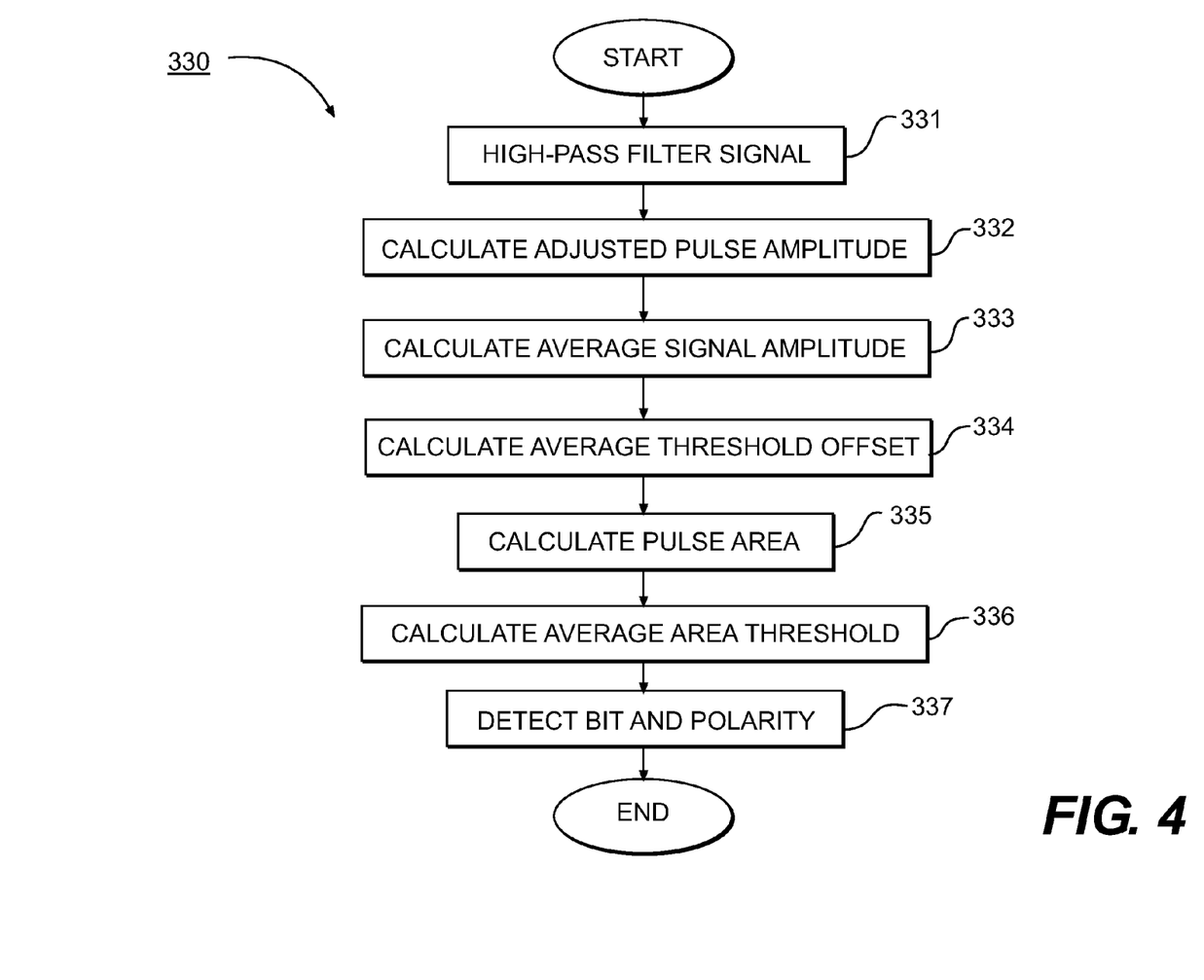
FIG. 4 is a flowchart of a method of identifying a magnetic flux transition according to an embodiment of the invention.

Turning now to FIG. 3, a method 300 of reading a magnetic tape according to an embodiment will be presented. The method 300 is undertaken for each bit of the magnetic tape 130 to be detected. The method begins at step 310 where an analog signal located on the magnetic tape 130 is read with the magnetoresistive head 130. Next, at step 320, the analog signal is converted into a digital signal by the analog-to-digital converter 106. The digital signal is then processed by undertaking the steps of a method 330 of identifying a magnetic flux transition by analysing voltage wave forms. An embodiment of the various steps implemented to identify the magnetic flux transition according to the method 330 is shown at FIG. 4. Next, at step 340, a bit and a polarity of the bit are detected based on the identified magnetic flux transition. The detected bit and the polarity of the detected bit are stored in a memory and may be further processed, for example, to detect that an error in the bit detection occurred (see FIG. 5).

Reference is now made to FIG. 4, where the various steps of the method 330 of identifying a magnetic flux transition in accordance with an embodiment are shown. The method 330 starts at step 331 where a digital signal is high-pass filtered. In an embodiment, an average value of the digital signal, also called "baseline signal" is determined, using a low-pass filter. The "baseline signal" is subtracted from the digital signal inputted to obtain a high-pass filtered digital signal.

At step 332, an "adjusted pulse amplitude" is calculated. In an embodiment, a peak of a positive pulse and/or a peak of a negative pulse of the signal are established to determine a pulse amplitude of the signal. The pulse amplitude is then reduced by the "baseline signal" to obtain the "adjusted pulse amplitude".

At step 333, an "average signal amplitude" of the digital signal is determined. The "average signal amplitude" may be determined by identifying positive and negative peaks of a preset number of detected bits. Next, at step 334, an "average threshold offset" variable, calculated by determining the value of a certain percentage (for example 20%) of the "average signal amplitude" of a preset number of detected bits is maintained. The "average threshold offset" variable may be preloaded with a constant during initialisation of the system 100.

At step 335, a "pulse area" is calculated based on the "adjusted pulse amplitude" signal. Boundaries of an area calculation of the signal are set when the "adjusted pulse amplitude" intersects with the "baseline signal". The calculated area is then reduced by the "average threshold offset" to determine the "pulse area" (i.e. the "pulse area" is equal to the calculated area minus the "average threshold offset").

At step 336, an "average area threshold" of the digital signal is determined. The "average area threshold" is calculated by averaging a certain percentage (for example 20%) of the "pulse area" of a preset number of detected bits.

The "average area threshold" variable may be preloaded with a constant during initialisation of the system 100.

At step 337, a bit and a polarity of a bit is detected if the "adjusted pulse amplitude" is greater than the "average threshold offset" and if the "pulse area" is greater than the "average area threshold".

Figure 5:
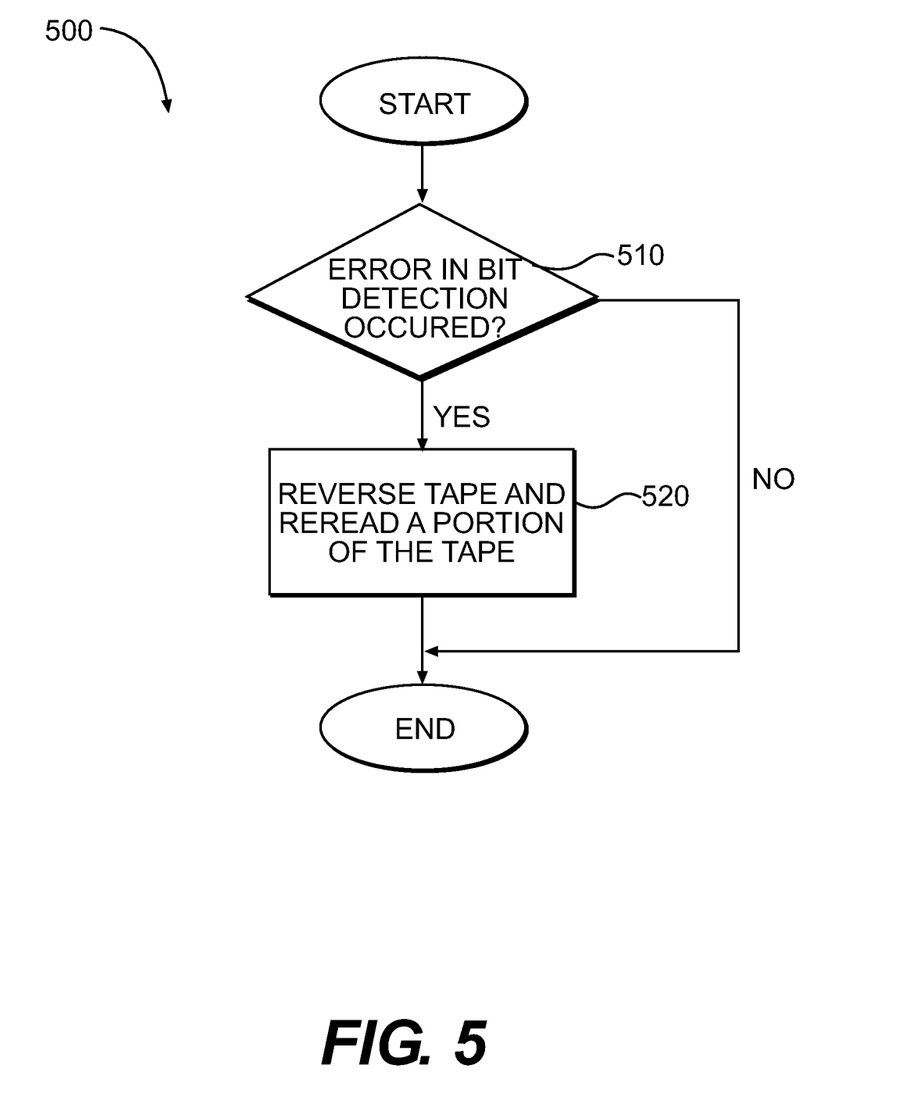
FIG. 5 is a flowchart of a method of detecting an error in bit detection according to an embodiment of the invention.

Turning now to FIG. 5, the steps of a method 500 of detecting an error in bit detection according to an embodiment are shown. The method 500 starts at step 510 where further processing of a detected bit (for example by undertaking steps of the method 330) occurs. In an embodiment, an error is detected if two detected adjacent bits have a same polarity, or if a cyclic redundancy check (CRC) is incorrect, or if longitudinal parity checksum errors are found. If an error is detected, the method 500 proceeds to step 520. At step 520, the method 500 causes the tape transport controller 112 to reverse the direction of the magnetic tape 130 to allow the magnetoresistive head 102 to reread a portion of the magnetic tape 130. In an embodiment, the step 520 includes analyzing a domain of a span of the byte (i.e. the period of byte—which is also a bit) or a block of the magnetic tape 130. (Spurious bits are being looked for when there should not be any, i.e. there is an error-or false bit.) If no error occurred, the detected bit is validated.

In order to simplify representation and description, methods depicted in FIG. 3, FIG. 4 and FIG. 5 are depicted as at least partially sequential, but it is contemplated that the methods might be divided into multiprocessing threads, multiple processes, or simultaneous processes.

While the methods disclosed herein have been described and shown with reference to particular steps performed in a particular order, it will be understood by a person skilled in the art that in some cases these steps may be combined, sub-divided, or re-ordered to form an equivalent method without departing from the teachings of the present invention. Accordingly, the order and grouping of the steps is not a limitation.

Although the processing of a single channel comprising a single analog signal is described above to simplify description, it is contemplated that the discrete-current-to-voltage converter 104, the analog-to-digital converter 106 and the processing unit 108 can process in parallel multiple channels, each channel representing a different analog signal stored on a different track of the magnetic tape 130.

It is contemplated that the magnetoresistive head 102, the tape transport controller 112, the discrete-current-to-voltage converter 104, the analog-to-digital converter 106, the processing unit 108, the tachometer 110 and the motor 114 can be integrated into a single unit or be separate components. It is also contemplated that the magnetoresistive head 102, the tape transport controller 112, the discrete-current-to-voltage converter 104, the analog-to-digital converter 106, the processing unit 108 and the tachometer 110 may be implemented with a combination of hardware and software/firmware elements.

It will be appreciated that, in some embodiments, certain functionality of a given component described herein (including the discrete-current-to-voltage converter 104, the analog-to-digital converter 106, the high-pass filter 202, the low-pass filter 203, the peak detector 204, the area calculator 206, the bit detector 208, the difference calculator 212 and the error detector 214) may be implemented as other kinds of pre-programmed hardware or firmware elements (e.g., application specific integrated circuits (ASICs), electronically erasable programmable read-only memories (EEPROMs), etc.) or other related elements. In other embodiments, a given component described herein (including the discrete-current-to-voltage converter 104, the analog-to-digital converter 106, the high-pass filter 202, the low-pass filter 203, the peak detector 204, the area calculator 206, the bit detector 208, the difference calculator 212 and the error detector 214) may comprise a processor having access to a code memory which stores program code (instructions) for operation of the processor to implement functionality of that given component. The program code may be stored on a medium which is tangible and readable directly by the given component (e.g., removable diskette, CD-ROM, ROM, fixed disk, USB key, etc.). Alternatively, the program code may be stored remotely and be transmittable to the given component via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A method of reading a magnetic tape comprising:
   reading an analog signal located on a magnetic tape via a magnetoresistive head;
   converting the analog signal into a digital signal via an analog-to-digital converter;
   identifying a magnetic flux transition in the digital signal via a processing unit, including, analyzing voltage wave forms of the digital signal, including,
      calculating an average threshold offset based on an average signal amplitude of at least a portion of the digital signal, and
      calculating an average area threshold based on a pulse area of at least a portion of the digital signal; and
   detecting a bit from the digital signal based on the identified magnetic flux transition.

2. The method of claim 1, wherein detecting a bit from the digital signal based on the identified magnetic flux transition comprises:
   calculating an adjusted pulse amplitude of the digital signal;
   calculating a pulse area of the digital signal;
   comparing the adjusted pulse amplitude with the average threshold offset; and
   comparing the pulse area with the average area threshold.

3. The method of claim 1, further comprising:
   determining whether an error occurred in the detection of the bit; and
   causing a tape transport controller to reverse a tape direction to allow the magnetoresistive head to reread a portion of the magnetic tape.

4. The method of claim 3, further comprising storing in a memory data regarding where a magnetic flux transition occurred based on a position value of the tape transport controller.

5. The method of claim 1, further comprising:
   reading a second analog signal with the magnetoresistive head; and
   processing a second digital signal in parallel with reading the analog signal with the magnetoresistive head and processing the digital signal.

6. A non-transient computer readable storage medium containing program code for execution by a computing device to implement a computer-implemented method of processing an analog signal read on a magnetic tape, the computer-implemented method comprising:
   converting the analog signal into a digital signal;
   identifying a magnetic flux transition in the digital signal unit, including, analyzing voltage wave forms of the digital signal, including,
      calculating an average threshold offset based on an average signal amplitude of at least a portion of the digital signal, and
      calculating an average area threshold based on a pulse area of at least a portion of the digital signal; and
   detecting a bit from the digital signal based on the identified magnetic flux transition.

7. The computer readable storage medium of claim 6, wherein detecting a bit from the digital signal based on the identified magnetic flux transition comprises:
   calculating an adjusted pulse amplitude of the digital signal;
   calculating a pulse area of the digital signal;
   comparing the adjusted pulse amplitude with the average threshold offset; and
   comparing the pulse area with the average area threshold.

8. The computer readable storage medium of claim 6, wherein the computer-implemented method further comprises:
   determining whether an error occurred in the detection of the bit; and
   causing a tape transport controller to reverse a tape direction to allow the magnetoresistive head to reread a portion of the magnetic tape.

9. The computer readable storage medium of claim 8, wherein the computer-implemented method further comprises storing in a memory data regarding where a magnetic flux transition occurred based on a position value of the tape transport controller.

10. The computer readable storage medium of claim 6, wherein the computer-implemented method further comprises:
    reading a second analog signal with the magnetoresistive head; and
    processing a second digital signal in parallel to reading the analog signal with the magnetoresistive head and processing the digital signal.

* * * * *